March 14, 1961     J. F. LABOON     2,975,122
METHOD OF SEWAGE TREATMENT
Original Filed June 9, 1950     2 Sheets-Sheet 1

Inventor
John F. Laboon
By Christy, Parmelee and Strickland
his Attorneys

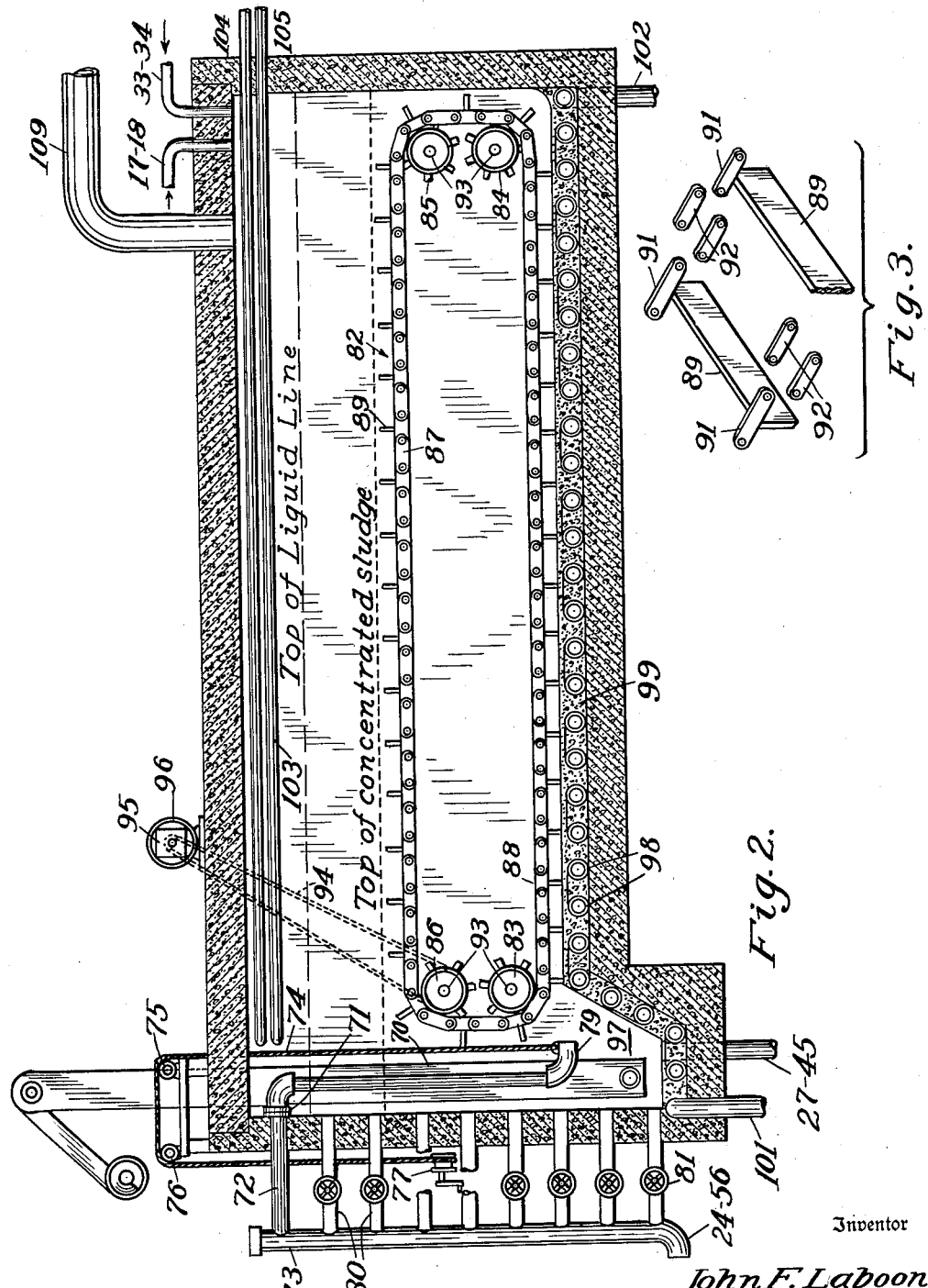

United States Patent Office 2,975,122
Patented Mar. 14, 1961

2,975,122

METHOD OF SEWAGE TREATMENT

John F. Laboon, 221 Buchanan Place, Pittsburgh, Pa.

Continuation of application Ser. No. 167,170, June 9, 1950. This application Dec. 13, 1956, Ser. No. 628,049

4 Claims. (Cl. 210—12)

The present invention is concerned generally with sewage treatment and more specifically with a novel and economical method of de-watering and concentrating sewage sludge for incineration or further treatment and disposal.

This application is a continuation of my copending application Serial No. 167,170, filed June 9, 1950, for Method of Sewage Disposal, now abandoned.

The principal object of the invention is to provide a novel and rapid method of de-watering and concentrating sewage solids permitting economical incineration thereof without the necessity for complete removal of water or use of chemicals.

The method of the invention is based upon the discovery, verified by experiments and pilot plant operation, that raw sludge can be concentrated biologically by flotation without use of chemicals and the concentrate can be incinerated without further mechanical de-watering or chemical treatment.

In the practice of the method herein described raw sewage as received at the treating plant is screened to remove inclusions and then passed through a suitable grit tank where grit and silt are removed. The sewage may be aerated in the grit tank or this step can be omitted. The sewage is then passed into settling tanks where the sludge settles and supernatant water is removed. The remaining raw or primary sludge is then transferred to concentration tanks where it is held for the required period for concentration biologically by flotation at optimum temperatures.

The flotation process is aided by heating the primary sludge to controlled temperatures. Flotation of the primary sludge is obtainable at temperatures from 20° C. to 55° C. The sludge at such temperatures will stratify in varying periods of time. At the lower temperatures flotation and concentration is effected in about five days. Temperature of about 35° C. provides optimum results. At about 35° C. the formation of gases, mainly $CO_2$, proceeds with sufficient rapidity to effect complete flotation in less than two days. Flotation should not proceed too rapidly since concentration or compaction is necessary to prevent undue escape of gas through the floating sludge. Once the gas has escaped the sludge again settles to the bottom of the tank and can not rise again. The addition of heat to the upper surface of the flotation material aids in preventing escape of the gases by encrusting the surface.

Daily temperatures and seasons of the year make necessary the provision of suitable controls to maintain optimum temperatures. Heating of the raw sludge does not take place until after removal from the settling tanks. As the sludge is removed from the settling tank, it should be heated until the body of sludge in the concentrating tanks is at the desired temperature and is maintained during the flotation period. The nature of the sewage may also affect the time of flotation and the optimum temperature, thus necessitating frequent supervision of temperatures.

The time of concentration or compacting of the sludge is also of major importance. The maximum period of concentration appears to be about five days. After this period the sludge again begins to settle. For this reason it is preferable to subcant the subnatant water as soon as desired flotation and stratification occurs and removal of the water does not carry off undue quantities of solids. The water so withdrawn may be advantageously returned to the grit tank instead of being discharged from the system.

The manner in which flotation and concentration of the sludge is obtained has not been exactly determined. After the heated raw sludge from the settling tanks is placed in the concentration tanks bacteritic and physical reactions occur in the sludge resulting in generation of gases and agglomeration of the solid components of the sludge. The gases in the agglomerate displace the water therein causing the agglomerate to float. The flotation material concentrates at the surface of the water and such concentrate has a moisture content of 80 to 90%.

After the subnatant water is removed from the concentrating tanks, the remaining flotation sludge may be disposed of in various ways. Such sludge when mixed to a uniform consistency with the water content the same throughout its mass may be economically burned in an incinerator. Where desired, the flotation sludge may be passed directly to a suitable vacuum filter and de-watered to form sludge cake. If it should be desired to make further use of the sludge by passing it through a suitable digester, the high percentage of solids in the flotation sludge permits a reduction in size of the digester and thus provides for greater economies in operation of this type of apparatus.

The advantages of the method herein described are many. The cost of sludge disposal by incineration as herein described has been estimated by experts to reflect a 20% savings in the capital investment required for the present system over that required for a conventional system including digestion, elutriation, mechanical de-watering and incineration facilities. This does not include annual savings of thousands of dollars on chemicals each year which may run as high as $50,000 per year for a system for a city of one million population.

Referring now to the drawings, there is shown therein a diagrammatic arrangement of apparatus for carrying out the herein described method and details of a sludge concentration and mixing apparatus.

Fig. 2 is a fragmentary view, partly in side elevation and partly in vertical section of a certain sludge concentration tank that forms an essential unit of the sewage treating system of the invention; and Fig. 3 is an "exploded" isometric view of a portion of the sludge-mixing mechanism installed in the concentration tank.

Figure 1:
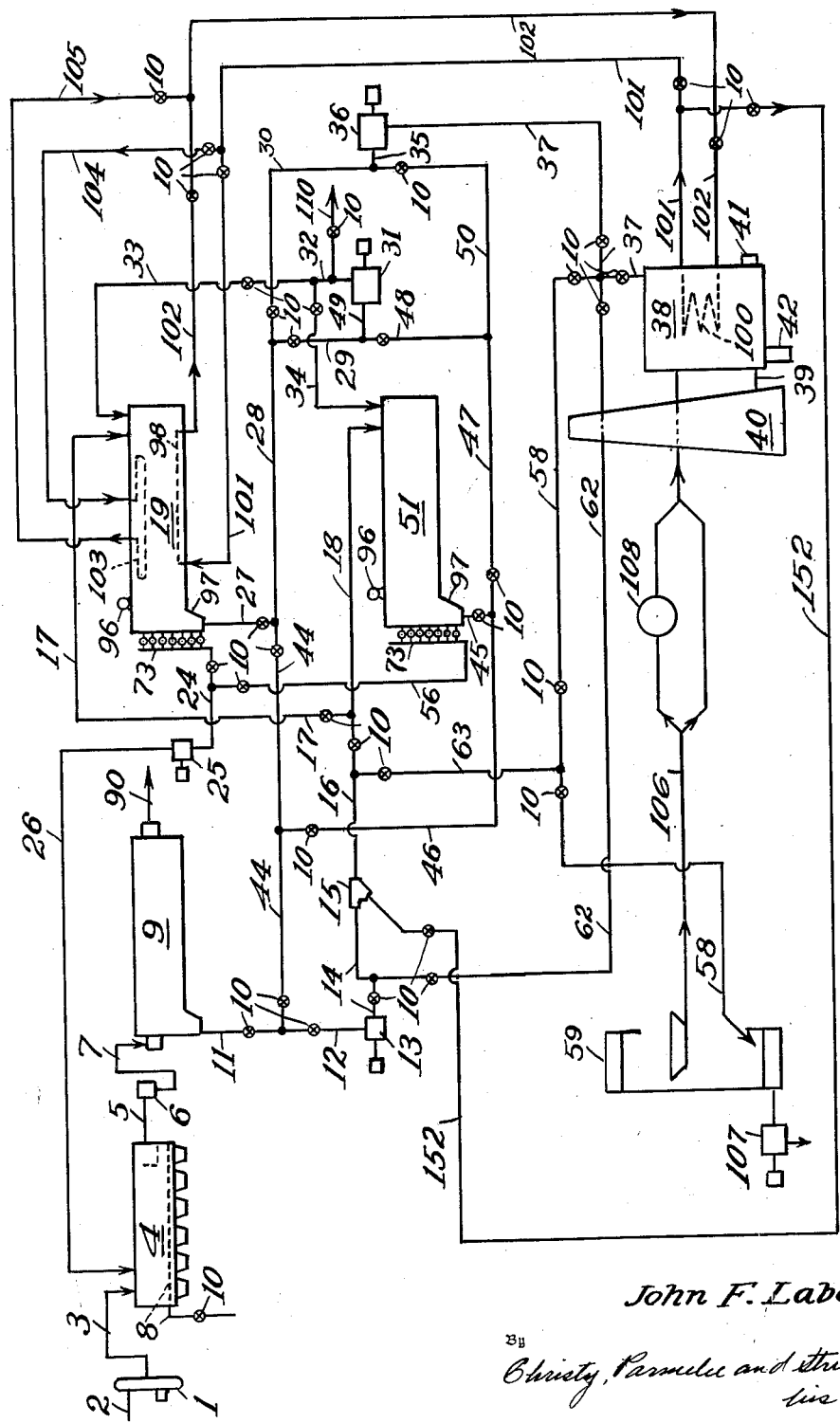
Fig. 1 is a diagrammatic view of a sewage disposal system providing an exemplary apparatus for the practice of the invention.

The raw sewage to be disposed of enters the system through a main sewer or duct 2, whence it passes through a screening apparatus 1 that removes paper and other inclusions that do not require special treatment prior to disposal. From the screening apparatus 1 the raw sewage enters a pre-aerating and grit tank 4 by way of a pipe 3. The sewage is collected in a body of substantial volume in this tank, and preferably air is introduced through a pipe 8 and caused to bubble upwardly through the body of the sewage for promoting the beneficial activities of aerobic micro-organisms upon the raw sewage. In the tank 4 the usual grit contained in sewage is settled and removed.

From tank 4 the sewage is delivered by pipe 5 to a comminutor or disintegrator 6, where lumps and coarse material are broken into small particles, to provide a fluid of a consistency that will not cause clogging of the pipes and pumps. Pipe 7 delivers the sewage to a settling tank 9, in which the solids in the sewage settle to the bottom of the tank to form what may be termed primary sludge that is inherently subject to biological activity, particularly when thermal conditions are adjusted and maintained at beneficial value, as will presently appear. The relatively clear supernatant is withdrawn from the settling tank through a line 90 leading to a suitable point of disposal, such as a stream, an ocean, a lake, or other place of disposal or treatment, with which this invention is not concerned. From tank 9 the primary sludge is, by means of a motor-driven primary sludge pump 13, selectively delivered either through a primary sludge line 11, 12, 14, 16, 17 to a sludge-concentrating tank 19, or through a primary sludge line 11, 12, 14, 16, 18 to a sludge-concentrating tank 51. On the delivery side of pump 13 means are provided for heating the sludge. Such means may comprise a heater in the form of a heat exchanger, or a steam or hot water injector, devices well known in the art. In this case a steam injector 15 is shown, and by the injection of steam into the sludge propelled by pump 13 the sludge is raised to a temperature of from 20° C. to 55° C.

The body of heated primary sludge in the concentration tanks 19 and 51 is allowed to stand for periods up to five days, depending upon the temperatures used, with the effect that the contents of the tank stratify to form a sludge concentration of from 80 to 90 percent moisture content that rises and floats upon a pool of subnatant liquid.

As soon as the sludge is concentrated to the desired degree and floated, the subnatant liquid is, by means of a pump 25, drawn from the concentrating tank through lines 24 and returned to the pre-aeration and grit tank by means of a line 26. In the case of the concentration tank 51, the pump subcants or draws off the subnatant water through the line 56.

To the end that the liquid may be subcanted at precisely the proper level below the surface of the sludge, a suction-tube 70 is pivotally connected as by a swivel joint 71, to a tube 72 connected to a stand-pipe 73, which in turn is connected to the subnatant liquid pump line 24. Means are provided for swinging the suction-tube 70, and such means may comprise a chain or cable 74 connected at one end to the distal end of the suction tube when the chain extends outwardly through the top of the tank, and is trained over sheaves 75 and 76 and attached to a hand winch 77 mounted on the outside wall of the tank. By means of the winch the suction-tube 70 may be manually swung on the axis of joint 71 so that the inlet end 79 of the suction-tube may be brought to the exact elevation in the sludge body where liquid is most advantageously removed under the suction of pump 25.

Each sludge-concentrating tank may also, and/or alternately, be provided with a series of connector tubes 80 that open between the tank and the stand-pipe 73 at vertically spaced intervals. Each connector pipe is provided with a valve 81 that is normally closed, but which may be opened in that connector pipe which is at the elevation at which liquid is to be subcanted from the tank under the effect of pump 25.

When all subnatant liquid has been removed from the tank (19 or 51) the sludge, which had been heretofore concentrated by flotation, forms a layer upon the floor of the tank. In accordance with this invention, such sludge concentrate is thoroughly mixed, as by means of an endless paddle chain 82 trained over four sprocket wheels 83, 84, 85 and 86 to extend in upper and lower flights, 87 and 88, respectively. In Fig. 3 a convenient type of paddle chain structure is indicated. The paddles 89 of the chain may carry rigidly at their opposite ends chain links 91, and paired interconnecting links 92 are articulated between the successive paddle links to form the endless chain structure. In effect the assembled structure comprises two endless chains extending one against or near the inner face of each side wall of the tank with the paddles 89 extending across the tank. There is a set of sprocket wheels 83–86 for each of the two chains in the paddle chain structure and these sprocket wheels are borne pair by pair upon shafts 93 journaled in pillow blocks mounted on the tank walls. The shaft of the pair of sprocket wheels 86 is geared by a chain or belt 94 to a speed reducer 95 driven by a reversible electric motor 96, subject to the control of a suitable push-button station, not shown.

The paddle chain driven by the reversible motor performs a dual function. It serves first as a mixing instrumentality and then as means for sweeping the sludge into a discharge pump 97 at one end of the tank. When the concentrated sludge has been deposited, as said, upon the bottom of the tank, the motor 96 is energized, to drive the paddle chain in such direction that the lower flight 88 of paddles travels in a left-to-right direction as viewed in Fig. 2. This causes the lower paddles to sweep the sludge toward the right hand end of the tan, where the sludge piles against the end wall of the tank, and is thoroughly blunged by the action of the paddle rounding the sprocket wheels 84, 85. In this way the concentrated sludge is mixed and reduced to a uniform consistency with the water content the same throughout the mass. Further mixing may, in some cases, be desirable, and this may be accomplished by means of additional mixing apparatus in the form of a suitable motor driven pump 31.

The pump 31 may be termed a sludge circulating pump. The intake of the pump is connected to the discharge sump 97 of tank 19 by means of a delivery line 27—28, 29, 49, while line 45, 47, 48, 49 connects the intake of such pump with the discharge sump of tank 51. When the sludge has been thoroughly mixed in the concentrating tank, the motor 96 of the tank is reversed, thereby driving the paddle chain in such direction that the paddles in the lower flight advance from right to left, as viewed in Fig. 2, with the effect that the sludge concentrate is swept and scraped by the lower line of paddles into the discharge sump 97 of the tank, whence it is drawn through the sludge delivery line and into the pump 31 and then discharged into a line 32. From line 32 the sludge is returned to tank (19 or 51) from which it was drawn, the return flow being by way of a line 33 in the case of tank 19 and a line 34 in the case of tank 51. The circulating flow of sludge from the tank, through pump 31 and back into the tank may be continued until an exceedingly uniform consistency of the sludge concentrate has been attained.

The pump 31 in the pump line as described may also be used to transfer the sludge concentrate from one concentrating tank to the other, etc. It will be noted that the pipe lines throughout the sewage treating system include appropriately placed valves 10 that may be opened or closed to provide for any of the various courses of flow described. In those instances where a refined sludge may be dumped into a lagoon or river, lake, or ocean, the mixed sludge may be pumped from the concentrating tank through a pipe line 110 to such point of disposal or may be loaded in barges or tank cars for transportation to the disposal area.

In those cases where incineration of sewage sludge is required in a plant of lowest capital investment, the mixed undigested sludge concentrate may be introduced without vacuum filtering, chemical treating or other processing directly into the incinerator 38 as previously described.

The incinerator may be of any known construction fired by means of a solid, or gaseous, or liquid fuel and a stick 40 is arranged to draw through a flue 39 the products of combustion developed in the incinerator. The ash from the incinerator is removed through a duct 42. The incinerator may, as known in the art, include a vertical series of hearths, with a rabbler mechanism provided for feeding the sludge progressively from the top hearth to the next lower one, and so on. Alternatively, a rotary kiln type apparatus may be provided for drying and burning the sludge concentrate or the sludge cake.

Such sludge concentrate, without elutriation or chemical treatment, may be converted into sludge cake in a conventional vacuum filter such as 59. In the apparatus described the transportation of the mixed sludge concentrate from the tank 19 or 51 to the vacuum filter 59 may be effected by any suitable means. It is preferable, as shown in the illustrated system, to use a pumping cycle. More particularly, a motor-driven pump 36 is provided for pumping the mixed sludge from either the concentrating tank to a delivery line 37 leading to the incinerator 38 or the vacuum filter 59. Preferably the mixed sludge is pumped into the vacuum filter 59 through a connecting line 58, and in known way this filter, under the suction of a vacuum pump 107, removes all free water from the sludge delivered by line 58, forming what is known as "sludge cake." The sludge cake produced in filter 59 is then conveyed over path 106 to the incinerator, or over path leading to a comminutor or disintegrator 108 for breaking up the cake prior to entering the incinerator.

Certain requirements of the apparatus and method described in the foregoing specification can be noted as important features. For example, in warm weather the primary sludge entering the concentration tanks may be heated to the specified optimum temperature simply by subjecting the sludge (on its way from the settling tank 9 to the concentrating tank 19 or 51) to the effect of the heater or steam injector 15 once. However, in cold weather further heating of the sludge may be very desirable. This further heating is effectively obtained by the provision of a by-pass line 44 from the sludge concentrate delivery line 27 of tank 19 to the primary sludge line 11, 12 on the inlet side of pump 13. A corresponding by-pass line 46 leads from the delivery line 45 of tank 51 through line 12 to the inlet of pump 13. Accordingly, the sludge initially heated and stored in either concentrating tank may be recirculated and subjected as often as need be to the heater 15 whereby the entire body of primary sludge may be brought to specified temperature uniformly throughout the concentrating tank in which it is contained.

Advantageously, provision is made for maintaining the body of sludge in the concentrating tank within 1° C. of the specified temperatures. Means to this end comprise heating tubes or coils 98 incorporated within the floor 99 of the tank, as shown in Fig. 2. The heat for these coils may be furnished by steam, or water, heated in a boiler or heat-exchange tubing 100 (Fig. 1) in the incinerator 38, and circulated through pipes 101 and 102 leading respectively to and from heating coils 98. It is important to note that the heating coils are incorporated within the structure of the floor of each tank, where they are not exposed to the accumulation and encrustation of sludge on their bodies. Such sludge as may tend, under the effect of heat of coils 98, to become caked on the floor of the tank is readily scraped loose and worked into the consistency desired by the action of the lower flight 88 of paddle chain in operation.

As a further provision against heat radiation losses, a heating coil 103 may be applied against the inner surface of the cover or roof of the concentrating tank and, as shown in Fig. 2, this coil may receive circulating hot water or steam by way of pipe 104 and deliver it by way of pipe 105 too. In fact the pipes 104 and 105 may comprise branches of the hot water or steam lines 101 and 102 leading from the incinerator, as shown in Fig. 1 connected to tank 19 only, and it will be manifest how such lines may also be connected to the coils 98 and 103 (Fig. 2) of the tank 51.

The heating coils 103 not only serve to inhibit a loss in the temperature of the sludge contained in the concentrating tank, but also serve to heat the air or atmosphere in the top of the tank. This heated atmosphere in the upper portion of the tank serves to dry the surface of the sludge concentrate that rises to the top of the liquid in the tank, thereby forming a crust on top of the floating sludge. The crust thus formed provides a barrier that reduces the escape of gases formed in the body of sludge, and this in turn promotes to an increased degree the desired concentration of sludge solids by flotation. Obviously a complete loss of the gases in the body of the sludge would cause it to sink to the floor of the tank as hereinbefore described. A vent 109 (Fig. 2) is provided at the top of the concentrating tank for the escape of vapors, and this vent may be connected to the chimney or stack 40. If odors are present the vented gases may be injected in the combustion chamber of the incinerator and deodorized. This vent may also be used to collect for use the combustible gases generated in the sludge in the concentrating tank, if any.

In large sewage treating installations, it will sometimes prove economical and desirable to digest the flotation sludge concentrate and provide for the recovery of the combustible gases that are generated by digestion of the sludge. Such gases may be used as fuel for electrical power generation or to run gas engines or to serve as fuel for heating or as fuel for the burner 41 of the incinerator. In such case, a digester tank may be provided and operated in a manner as well known in the art. The flotation sludge from tanks 19 or 51 are preferably transferred directly to the digester.

The digested sludge remaining after the digesting process may be directly delivered to and burned in the incinerator 38 or it may be chemically treated and dewatered in the filter unit 59 before delivery to the incinerator. Alternatively the de-watered digested sludge may be used in the preparation of commercial fertilizer.

The steam or hot water for the heater or injector 15 may be derived from the boiler 100 in the incinerator, a line 152 connecting the injector to the delivery line 101 of the boiler. In a modification the steam or hot water for the injector may be obtained from an independently fired or electrically heated boiler or heat exchanger.

The sludge concentrating tanks 19 and 51 are shown to be rectangular, as viewed in plan, but it will be manifest that circular tanks may be employed and of course any desired number of concentrating tanks may be provided in a given installation.

I claim:

1. The method herein described which comprises screening sewage, aerating the sewage and removing grit therefrom, comminuting the solids in the sewage, forming a sludge by the sedimentation of the comminuted solids in the sewage, removing supernatant liquid from the sedimentation sludge, maintaining a body of such sedimentation sludge at a bacterial gas-producing temperature of 20° C. to 55° C. and thereby effecting the flotation and concentration of such sludge, applying heat directly to the upper surface of the floating sludge to accelerate formation of a top crust on the surface of the floating sludge to retard the escape of included gases therefrom, separating the subnatant liquid from the flotation sludge concentrate, and thoroughly mixing the flotation sludge to provide a substantially uniform mixture of the solids and residual liquid therein for the further treatment or disposal thereof.

2. The method herein described which comprises screening sewage, aerating the sewage and removing grit therefrom, comminuting the solids in the sewage, forming a sludge by the sedimentation of the comminuted solids in the sewage, removing supernatant liquid from the sedimentation sludge, maintaining a body of such sedimentation sludge at a bacterial gas-producing temperature of 20° C. to 55° C. and thereby effecting the flotation and concentration of such sludge, applying heat directly to the upper surface of the floating sludge to accelerate formation of a top crust on the surface of the floating sludge to retard the escape of included gases therefrom, separating the subnatant liquid from the flotation sludge concentrate, and thoroughly mixing the flotation sludge to provide a substantially uniform mixture of the solids and residual liquid therein, then passing the mixture to a vacuum filter for removing all water thereof, and disposing of the dry residue.

3. The method herein described which includes maintaining a body of sewage sludge obtained by sedimentation at a bacterial gas-producing temperature and effecting the flotation and concentration of such sludge, applying heat directly to the upper surface of the floating sludge to accelerate formation of a top crust on the surface of the floating sludge to retard the escape of included gases therefrom, separating the subnatant liquid from the flotation sludge concentrate, and thoroughly mixing the flotation sludge to provide a substantially uniform mixture of the solids and residual liquid therein for the further treatment or disposal thereof.

4. The method herein described which includes heating a sewage sludge and maintaining it at a bacterial gas-producing temperature and thereby effecting the flotation and concentration of such sludge, applying heat directly to the upper surface of the floating sludge to accelerate formation of a top crust on the surface of the floating sludge to retard the escape of included gases therefrom, separating the subnatant liquid from the flotation sludge concentrate, thoroughly mixing the flotation sludge and forming a substantially uniform mixture of the solids and residual liquid therein, and de-watering said uniform mixture for the further treatment or disposal thereof.

References Cited in the file of this patent
UNITED STATES PATENTS

| | | |
|---|---|---|
| 1,056,548 | Imhoff | Mar. 18, 1913 |
| 1,083,833 | Irwin | Jan. 6, 1914 |
| 1,122,155 | Pratt | Dec. 22, 1914 |
| 1,430,182 | Peck | Sept. 26, 1922 |
| 1,963,581 | Heukelekian | June 19, 1934 |
| 2,277,718 | Sanders | Mar. 31, 1942 |
| 2,430,519 | Mallory | Nov. 11, 1947 |
| 2,442,241 | Koruzo et al. | May 25, 1948 |
| 2,615,842 | Kraus | Oct. 28, 1952 |
| 2,772,234 | Kelly | Nov. 27, 1956 |
| 2,777,815 | Forrest | Jan. 15, 1957 |
| 2,786,025 | Lamb et al. | Mar. 19, 1957 |

OTHER REFERENCES

Steel, Water Supply and Sewage, 2d ed., 1947, pages 589–591, 595 and 596.